US012693854B2

(12) United States Patent
Likhitha et al.

(10) Patent No.: US 12,693,854 B2
(45) Date of Patent: Jul. 28, 2026

(54) SYSTEMS AND METHODS FOR EVALUATING COMPUTING PROGRAMMING CODE CHANGES USING AI TO IMPROVE COMPUTING PERFORMANCE AND COMPONENT CONSUMPTION

(71) Applicant: BANK OF AMERICA CORPORATION, Charlotte, NC (US)

(72) Inventors: A Likhitha, Hyderabad (IN); Yenamandra Satya Murthy, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 267 days.

(21) Appl. No.: 18/385,596

(22) Filed: Oct. 31, 2023

(65) Prior Publication Data

US 2025/0138813 A1 May 1, 2025

(51) Int. Cl.
*G06F 8/71* (2018.01)
*G06F 8/35* (2018.01)

(52) U.S. Cl.
CPC . *G06F 8/71* (2013.01); *G06F 8/35* (2013.01)

(58) Field of Classification Search
CPC ................. G06F 8/71; G06F 8/35; G06F 8/77
See application file for complete search history.

(56) References Cited

U.S. PATENT DOCUMENTS

| | | | |
|---|---|---|---|
| 5,553,282 | A | 9/1996 | Parrish |
| 10,423,779 | B2 | 9/2019 | Horne |
| 10,616,286 | B2 | 4/2020 | Frankland |
| 10,869,199 | B2 | 12/2020 | Raleigh |
| 10,901,727 | B2 | 1/2021 | Biddle |
| 10,942,913 | B1 | 3/2021 | Khoyilar |
| 11,038,784 | B2 | 6/2021 | Nickolov |
| 11,061,908 | B2 | 7/2021 | Kemp |

(Continued)

FOREIGN PATENT DOCUMENTS

| | | | |
|---|---|---|---|
| AU | 2018203054 | A1 | 5/2018 |
| CA | 3003773 | C | 4/2021 |
| CN | 110495132 | A | 11/2019 |

*Primary Examiner* — Wei Y Mui
*Assistant Examiner* — Travis Viet Tran
(74) *Attorney, Agent, or Firm* — Moore & Van Allen PLLC; Lauren M. Stokes

(57) ABSTRACT

Systems, computer program products, and methods are described herein for evaluating computing programming code changes using AI to improve computing performance and component consumption. The present invention is configured to identify at least one code commit change; determine whether the at least one code commit change matches at least one runtime restriction statement; classify the at least one code commit change as a restriction code commit change; identify at least one object reference, at least one class, and at least one method associated with the restriction code commit change; initiate a trigger-class method trace module on the restriction code commit change, wherein the trigger-class method trace module generates at least one runtime restriction weight associated with each restriction code commit change; and initiate a trigger flow trace module on the restriction code commit change and generate at least one suggested code commit change.

18 Claims, 11 Drawing Sheets

(56) References Cited

U.S. PATENT DOCUMENTS

| | | | | |
|---|---|---|---|---|
| 2009/0070734 | A1 | 3/2009 | Dixon | |
| 2010/0058294 | A1 | 3/2010 | Best | |
| 2012/0036497 | A1 | 2/2012 | Karthik | |
| 2013/0047137 | A1* | 2/2013 | Bak | G06F 8/71 717/121 |
| 2014/0053135 | A1 | 2/2014 | Bird | |
| 2014/0380280 | A1 | 12/2014 | Millwood | |
| 2015/0143335 | A1* | 5/2015 | Jain | G06F 8/70 717/121 |
| 2016/0224803 | A1* | 8/2016 | Frank | G06F 21/6245 |
| 2018/0129483 | A1 | 5/2018 | Biddle | |
| 2018/0129497 | A1 | 5/2018 | Biddle | |
| 2019/0129701 | A1* | 5/2019 | Hawrylo | G06F 8/71 |
| 2022/0066772 | A1 | 3/2022 | Gowda | |
| 2022/0239603 | A1* | 7/2022 | Greenshpan | G06F 8/77 |
| 2023/0122397 | A1* | 4/2023 | Sathyamoorthy | G06F 9/451 717/130 |
| 2023/0142895 | A1* | 5/2023 | Campbell | G06F 8/76 717/140 |
| 2023/0168996 | A1* | 6/2023 | Bregman | G06F 11/3692 717/124 |
| 2024/0134614 | A1* | 4/2024 | Bakshi | G06F 8/65 |
| 2025/0013464 | A1* | 1/2025 | Singh | G06F 9/44505 |

* cited by examiner

300

IDENTIFY AT LEAST ONE CODE COMMIT CHANGE
302

COMPARE THE AT LEAST ONE CODE COMMIT CHANGE TO AT LEAST ONE
RUNTIME RESTRICTION STATEMENT STORED IN A RULE-SET DATABASE MODULE
304

DETERMINE WHETHER THE AT LEAST ONE CODE COMMIT CHANGE MATCHES AT
LEAST ONE RUNTIME RESTRICTION STATEMENT
306

CLASSIFY, IN RESPONSE TO DETERMINING THE AT LEAST ONE CODE COMMIT
CHANGE MATCHES THE AT LEAST ONE RUNTIME RESTRICTION STATEMENT, THE
AT LEAST ONE CODE COMMIT CHANGE AS AN AT LEAST ONE RESTRICTION CODE
COMMIT CHANGE
308

IDENTIFY AT LEAST ONE OBJECT REFERENCE, AT LEAST ONE CLASS, AND AT
LEAST ONE METHOD ASSOCIATED WITH THE AT LEAST ONE RESTRICTION CODE
COMMIT CHANGE
310

INITIATE A TRIGGER-CLASS METHOD TRACE MODULE ON THE AT LEAST ONE
RESTRICTION CODE COMMIT CHANGE, WHEREIN THE TRIGGER-CLASS METHOD
TRACE MODULE GENERATES AT LEAST ONE RUNTIME RESTRICTION WEIGHT
ASSOCIATED WITH EACH RESTRICTION CODE COMMIT CHANGE
312

INITIATE A TRIGGER FLOW TRACE MODULE ON THE AT LEAST ONE RESTRICTION
CODE COMMIT CHANGE, WHEREIN THE TRIGGER FLOW TRACE MODULE
GENERATES AT LEAST ONE SUGGESTED CODE COMMIT CHANGE BASED ON AT
LEAST ONE OF THE AT LEAST ONE RUNTIME RESTRICTION WEIGHT, THE AT LEAST
ONE OBJECT REFERENCE, OR THE AT LEAST ONE METHOD, AND WHEREIN THE AT
LEAST ONE SUGGESTED CODE COMMIT CHANGE DECREASES A RUNTIME
RESTRICTION LEVEL
314

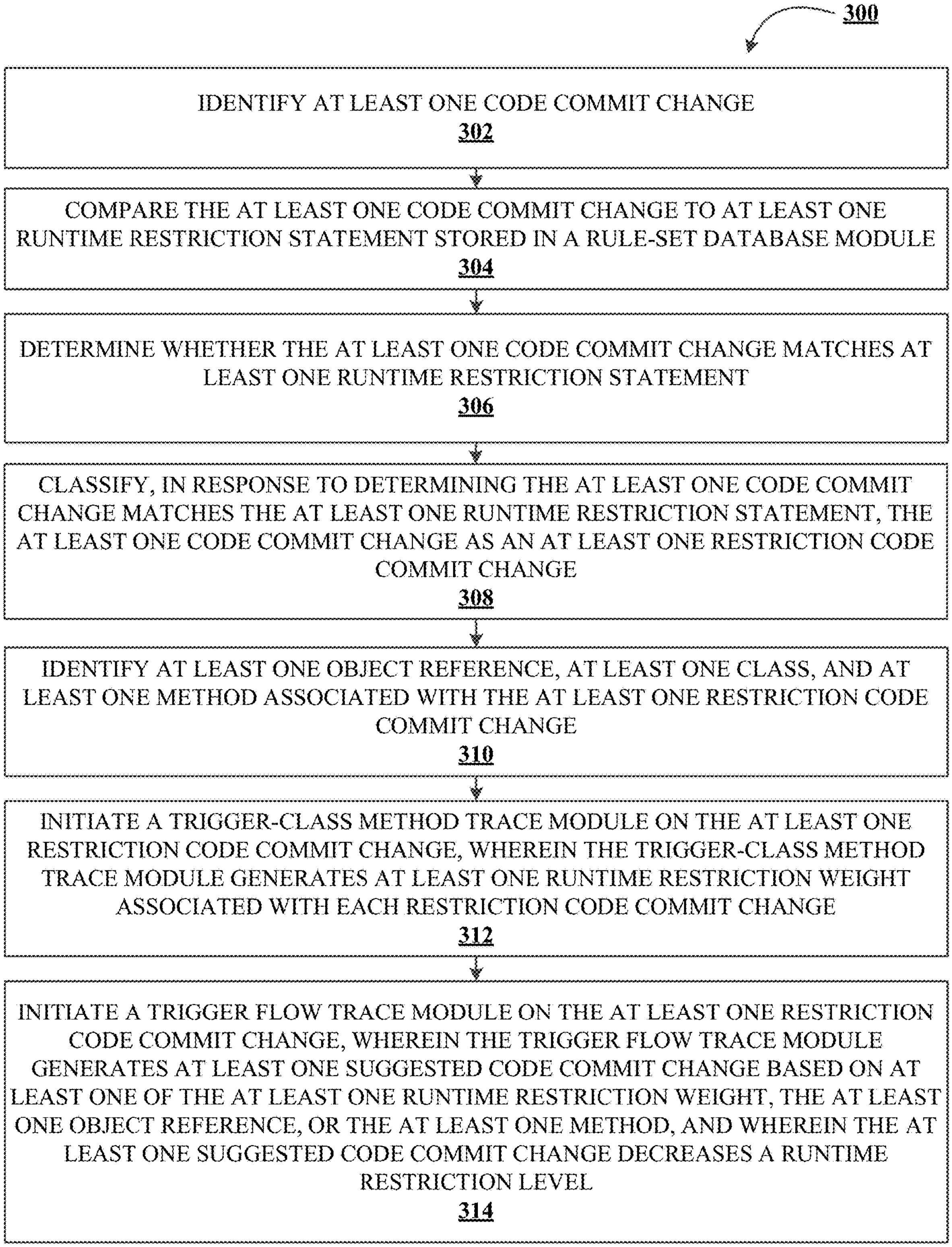

FIGURE 3

IDENTIFY AT LEAST ONE PREVIOUS OBJECT REFERENCE ASSOCIATED WITH THE PREVIOUS COMMITTED CODE
402

IDENTIFY AT LEAST ONE OF AT LEAST ONE CLASS, AT LEAST ONE METHOD, OR AT LEAST ONE RUNTIME RESTRICTION STATEMENT FOR THE PREVIOUS COMMITTED CODE
406

DETERMINE, BASED ON THE AT LEAST ONE PREVIOUS OBJECT REFERENCE, A PREVIOUS COMMITTED RUNTIME RESTRICTION WEIGHT
404

DETERMINE, BASED ON AT LEAST ONE OF THE AT LEAST ONE CLASS, THE AT LEAST ONE METHOD, OR THE AT LEAST ONE RUNTIME RESTRICTION STATEMENT FOR THE PREVIOUS COMMITTED CODE, THE PREVIOUS COMMITTED RUNTIME RESTRICTION WEIGHT
408

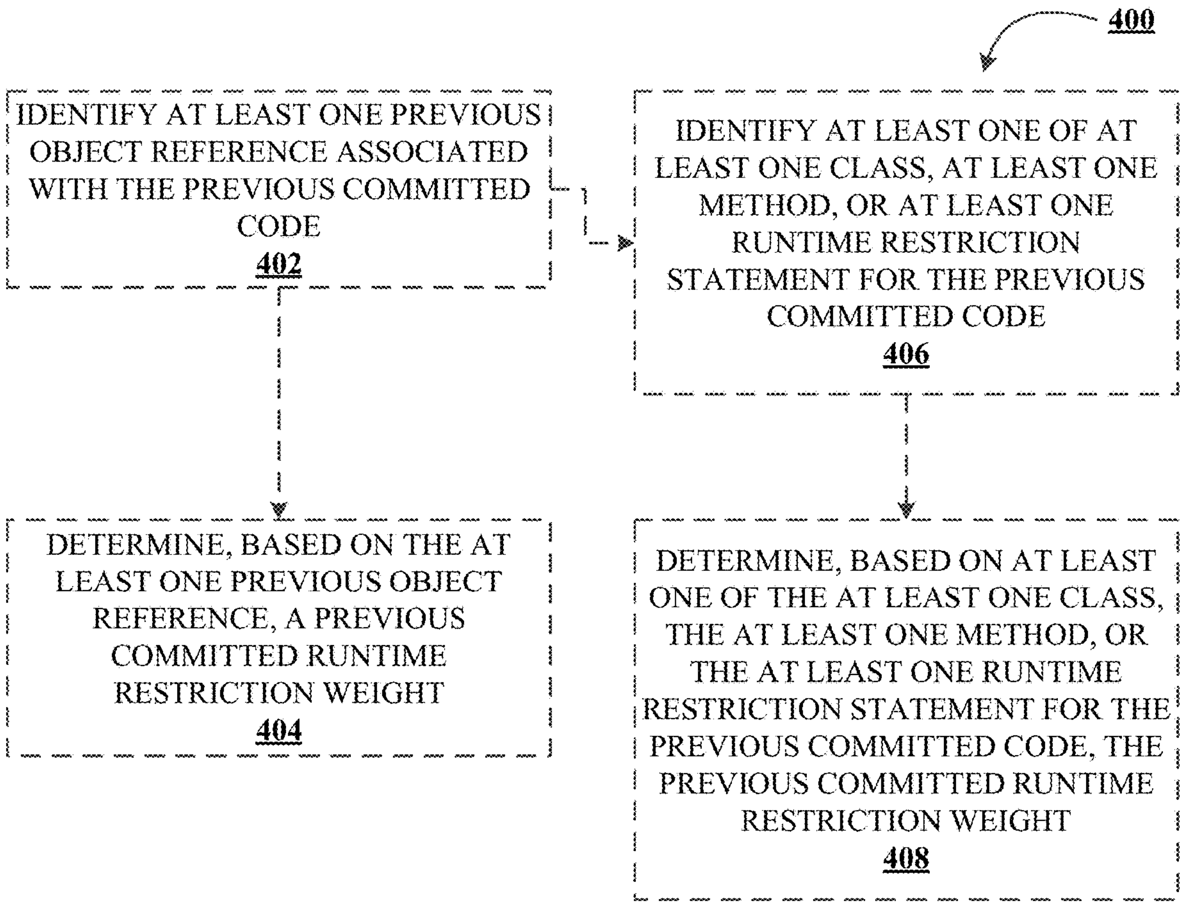

IDENTIFY, BY THE AT LEAST ONE LEXICAL ANALYSIS COMPONENT, THE AT LEAST ONE CLASS OR AT LEAST ONE METHOD FOR THE AT LEAST ONE CODE COMMIT CHANGE
602

ANALYZE EACH METHOD OF THE AT LEAST ONE METHOD FOR THE AT LEAST ONE CODE COMMIT CHANGE
604

DETERMINE, BASED ON THE ANALYZATION OF EACH METHOD, THE AT LEAST ONE RUNTIME RESTRICTION STATEMENT BASED ON THE RULE-SET DATABASE MODULE
606

GENERATE, BASED ON THE AT LEAST ONE RUNTIME RESTRICTION STATEMENT, A RUNTIME RESTRICTION WEIGHT
608

REFINE THE AT LEAST ONE CODE COMMIT CHANGE ASSOCIATED WITH THE AT LEAST ONE RUNTIME RESTRICTION STATEMENT AND IDENTIFY THE OBJECT REFERENCE FOR THE AT LEAST ONE CODE COMMIT CHANGE
610

MAINTAIN A LOGIC FLOW ASSOCIATED WITH THE AT LEAST ONE CODE COMMIT CHANGE, WHEREIN THE LOGIC FLOW COMPRISES A HIERARCHICAL DATA FORMAT AND THE AT LEAST ONE OBJECT RUNTIME RESTRICTION WEIGHT
612

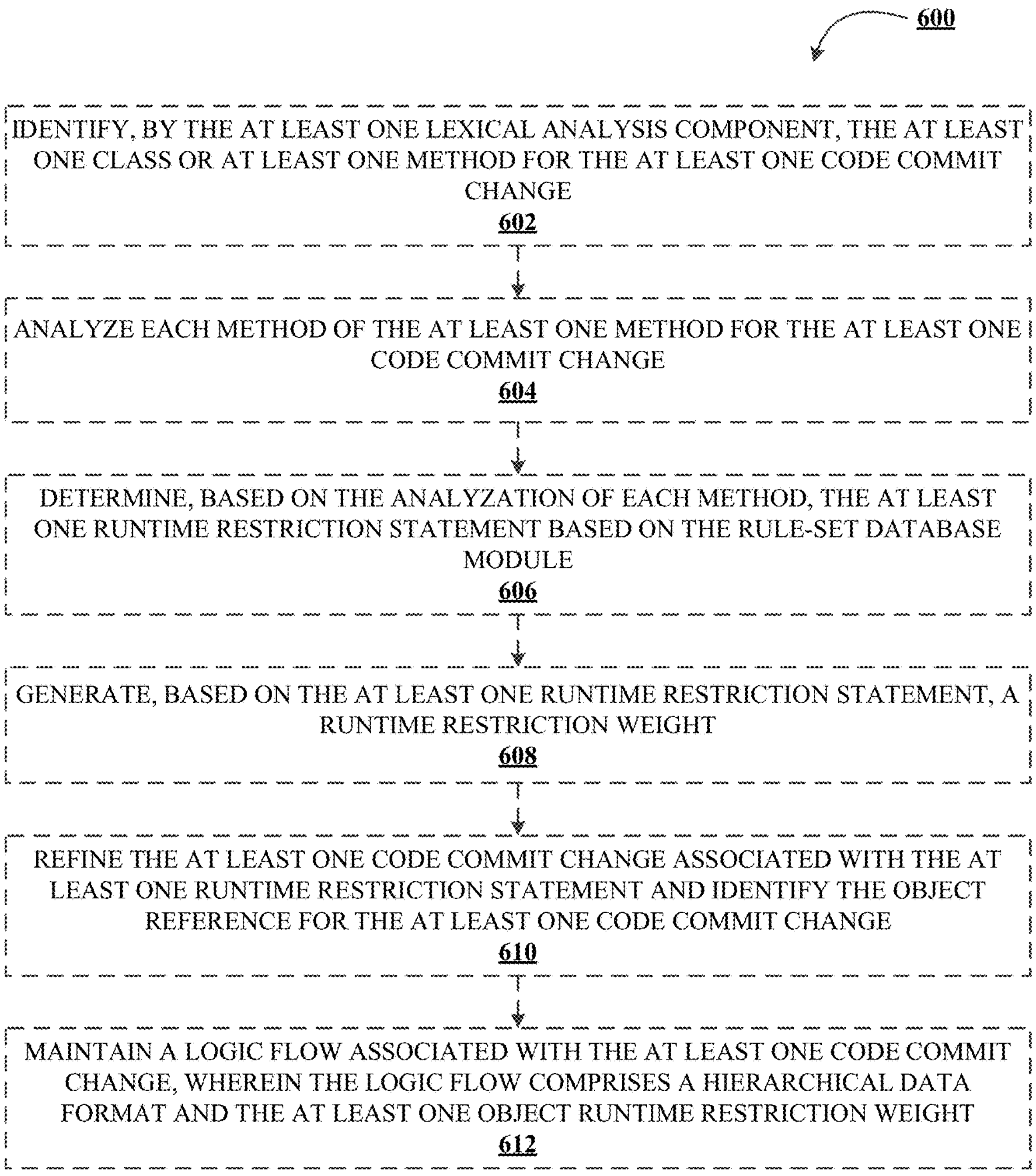

FIGURE 6

IDENTIFY AT LEAST ONE TRIGGER ASSOCIATED WITH THE AT LEAST ONE CODE COMMIT CHANGE, WHEREIN THE AT LEAST ONE TRIGGER IS ASSOCIATED WITH AT LEAST ONE OBJECT REFERENCE
702

ANALYZE THE AT LEAST ONE TRIGGER ASSOCIATED WITH THE AT LEAST ONE OBJECT REFERENCE
704

IDENTIFY, BY THE AT LEAST ONE LEXICAL ANALYSIS COMPONENT, AT LEAST ONE CLASS-METHOD CALLOUT ASSOCIATED WITH THE AT LEAST ONE TRIGGER
706

ANALYZE THE AT LEAST ONE CLASS-METHOD CALLOUT AND DETERMINE THE AT LEAST ONE RUNTIME RESTRICTION STATEMENT BASED ON THE RULE-SET DATABASE MODULE
708

GENERATE, BASED ON THE AT LEAST ONE RUNTIME RESTRICTION STATEMENT, A RUNTIME RESTRICTION WEIGHT
710

REFINE THE AT LEAST ONE CODE COMMIT CHANGE ASSOCIATED WITH THE AT LEAST ONE RUNTIME RESTRICTION STATEMENT AND IDENTIFY THE OBJECT REFERENCE FOR THE AT LEAST ONE CODE COMMIT CHANGE
712

MAINTAIN A LOGIC FLOW ASSOCIATED WITH THE AT LEAST ONE CODE COMMIT CHANGE, WHEREIN THE LOGIC FLOW COMPRISES A HIERARCHICAL DATA FORMAT AND THE AT LEAST ONE OBJECT RUNTIME RESTRICTION WEIGHT
714

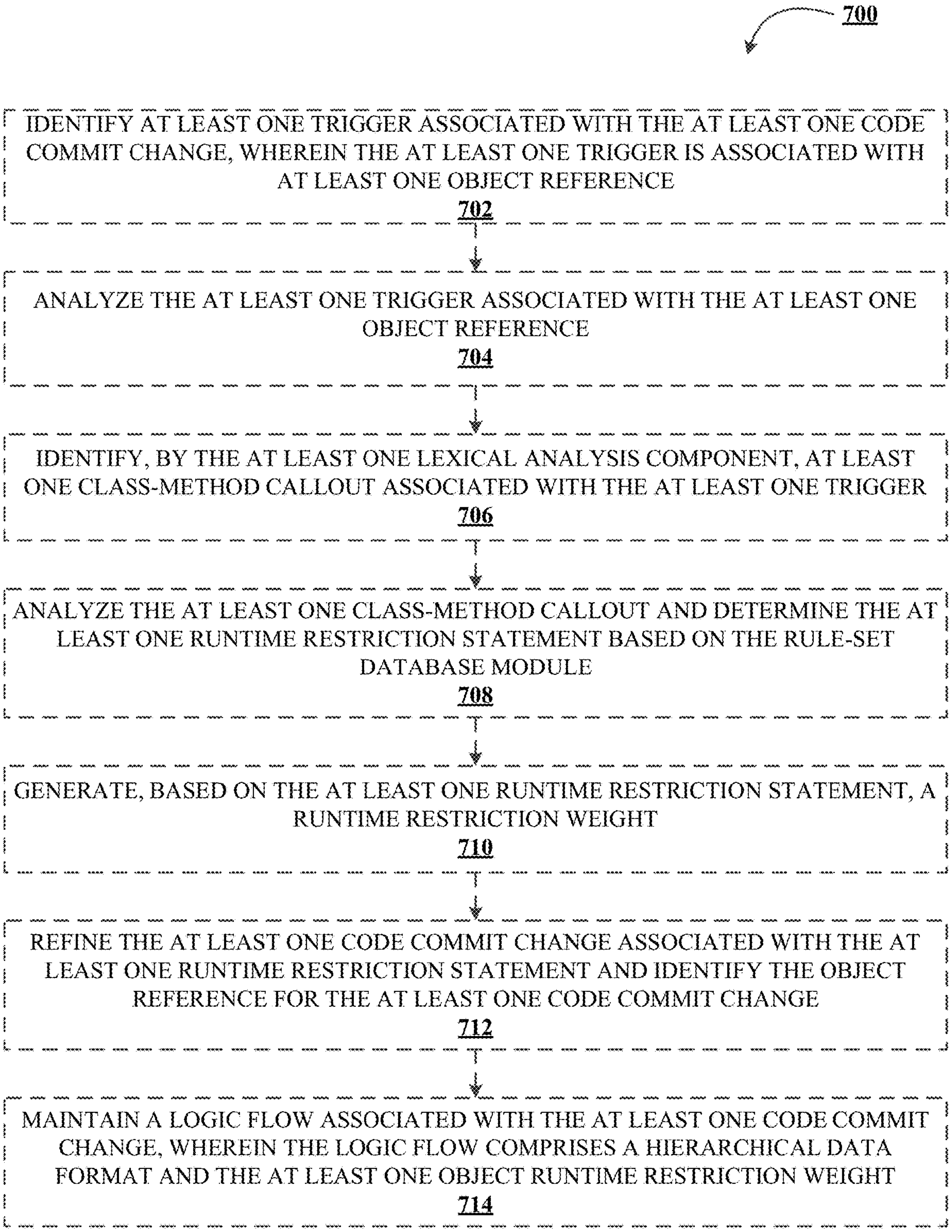

SYSTEMS AND METHODS FOR EVALUATING COMPUTING PROGRAMMING CODE CHANGES USING AI TO IMPROVE COMPUTING PERFORMANCE AND COMPONENT CONSUMPTION

FIELD OF THE INVENTION

The present invention embraces a system for evaluating computing programming code changes using AI to improve computing performance and component consumption.

BACKGROUND

Tenants and users of Software as a Service (SaaS) providers and Platform as a Service (PaaS) providers have many challenges, especially when SaaS and PaaS providers have limits on how often the SaaS and PaaS providers can be used, or how often their shared resources (e.g., platforms, database, applications, and/or the like) are being used or accessed. Additionally, and in order for one user not to monopolize the shared resources and to keep the shared resources operating efficiently and performing correctly, limits (e.g., restrictions on certain statements) are imposed. Further issues arise when code commit changes are implemented to code files or code repositories, when some code changes could increase the number of interactions that occur in the shared resources. Thus, there exists a need for a system which can efficiently, securely, and dynamically determine which code commit changes will result in greater interactions to shared resources, and thus, a closer possibility of meeting the shared resource's limit(s) and causing greater stress on the shared resources and other computing components.

Applicant has identified a number of deficiencies and problems associated with evaluating computing programming code changes, especially with respect to improving performance and component consumption. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for evaluating computing programming code changes using AI to improve computing performance and component consumption is provided. In some embodiments, the system may comprise: a memory device with computer-readable program code stored thereon; at least one processing device, wherein executing the computer-readable code is configured to cause the at least one processing device to perform the following operations: identify at least one code commit change; compare the at least one code commit change to at least one runtime restriction statement stored in a rule-set database module;

determine whether the at least one code commit change matches at the at least one runtime restriction statement; classify, in response to determining the at least one code commit change matches the at least one runtime restriction statement, the at least one code commit change as an at least one restriction code commit change; identify at least one object reference, at least one class, and at least one method associated with the at least one restriction code commit change; initiate a trigger-class method trace module on the at least one restriction code commit change, wherein the trigger-class method trace module generates at least one runtime restriction weight associated with each restriction code commit change; and initiate a trigger flow trace module on the at least one restriction code commit change, wherein the trigger flow trace module generates at least one suggested code commit change based on at least one of the at least one runtime restriction weight, the at least one object reference, or the at least one method, and wherein the at least one suggested code commit change decreases a runtime restriction level.

In some embodiments, the at least one code commit change is associated with at least one source code, at least one file, or at least one code repository comprising previous committed code. In some embodiments, the computer-readable code is configured to cause the at least one processing device to perform the following operations: identify at least one previous object reference associated with the previous committed code; and determine, based on the at least one previous object reference, a previous committed runtime restriction weight. In some embodiments, the computer-readable code is configured to cause the at least one processing device to perform the following operations: identify at least one of at least one class, at least one method, or at least one runtime restriction statement for the previous committed code; and determine, based on at least one of the at least one class, the at least one method, or the at least one runtime restriction statement for the previous committed code, the previous committed runtime restriction weight.

In some embodiments, the runtime restriction weight is based on a trigger flow action, and wherein the at least one object reference is based on an action location for the trigger flow action.

In some embodiments, the computer-readable code is configured to cause the at least one processing device to perform the following operations: generate a pull request alert interface component based on the at least one suggested code commit change; and transmit the pull request alert interface component to a user device, wherein the pull request alert interface component configures a graphical user interface of the user device. In some embodiments, the at least one pull request alert interface component comprises an identifier associated with the at least one restriction code commit change.

In some embodiments, the trigger-class method module comprises at least one lexical analysis component comprising a regular expression component, and wherein the trigger-class method module is configured to: identify, by the at least one lexical analysis component, the at least one class or the at least one method for the at least one code commit change; analyze each method of the at least one method for the at least one code commit change; determine, based on the analyzation of each method, the at least one runtime restriction statement based on the rule-set database module; generate, based on the at least one runtime restriction statement, a runtime restriction weight; refine the at least one code commit change associated with the at least one runtime restriction statement and identify the object reference for the at least one code commit change; and maintain a logic flow associated with the at least one code commit change, wherein the logic flow comprises a hierarchical data format and the at least one object runtime restriction weight.

In some embodiments, the trigger flow trace module comprises a trigger trace module and a trained artificial intelligence engine. In some embodiments, the trigger trace module comprises at least one lexical analysis component comprising a regular expression component, and wherein the trigger trace module is configured to: identify at least one trigger associated with the at least one code commit change, wherein the at least one trigger is associated with the at least one object reference; analyze the at least one trigger associated with the at least one object reference; identify, by the at least one lexical analysis component, at least one class-method callout associated with the at least one trigger; analyze the at least one class-method callout and determine the at least one runtime restriction statement based on the rule-set database module; generate, based on the at least one runtime restriction statement, a runtime restriction weight; refine the at least one code commit change associated with the at least one runtime restriction statement and identify the object reference for the at least one code commit change; and maintain a logic flow associated with the at least one code commit change, wherein the logic flow comprises a hierarchical data format and the at least one object runtime restriction weight.

In some embodiments, the trained artificial intelligence engine comprises a neural network, and wherein the trained artificial intelligence engine is configured to: process at least one code commit change; determine whether the at least one code commit change is part of a trigger flow action, wherein the trigger flow action is based on the at least one runtime restriction statement associated with the at least one code commit change; generate, in response to determining whether the at least one code commit change is part of the trigger flow action, a status update interface component, wherein, in an instance where the at least one code commit change is part of the trigger flow action, the status update interface component comprises the at least one runtime restriction weight for the at least one code commit change and at least one previous committed runtime restriction weight, or wherein, in an instance where the at least one code commit change is not part of the trigger flow action, the status update interface component comprises an accepted code change of the at least one code commit change; and transmit the status update interface component to a user device and configure a graphical user interface of the user device with the status update interface component.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
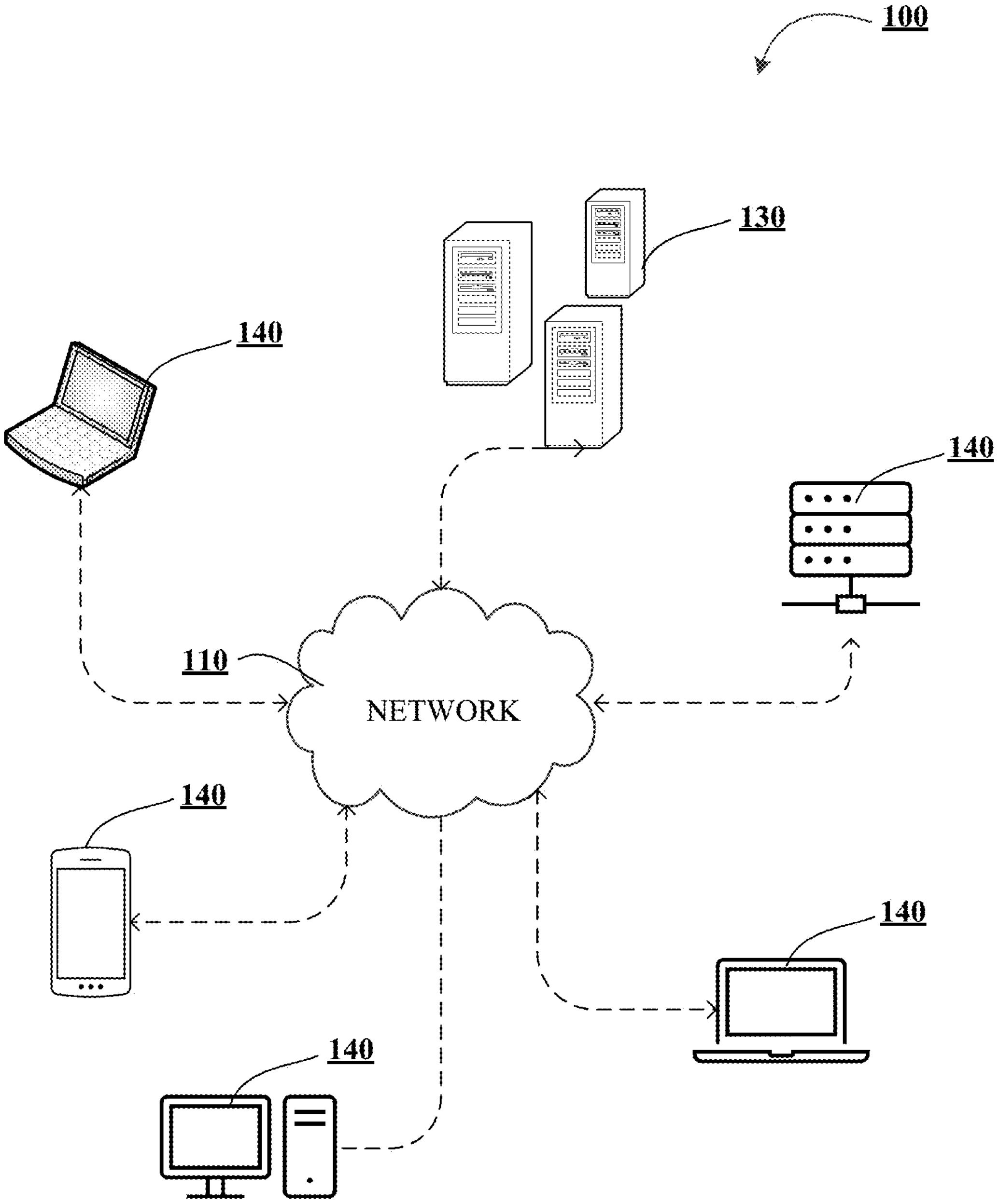
Figure 1B:
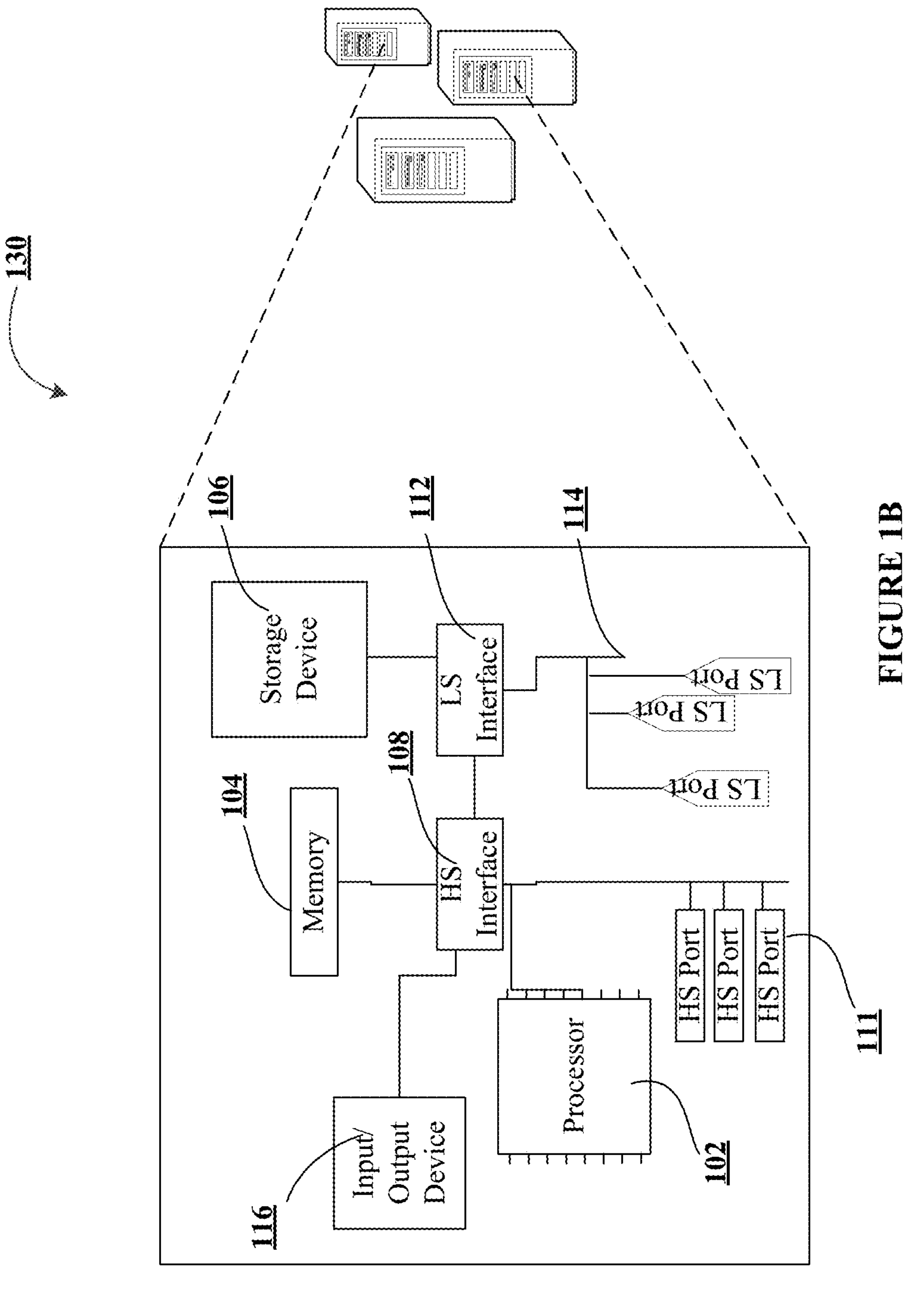
Figure 1C:
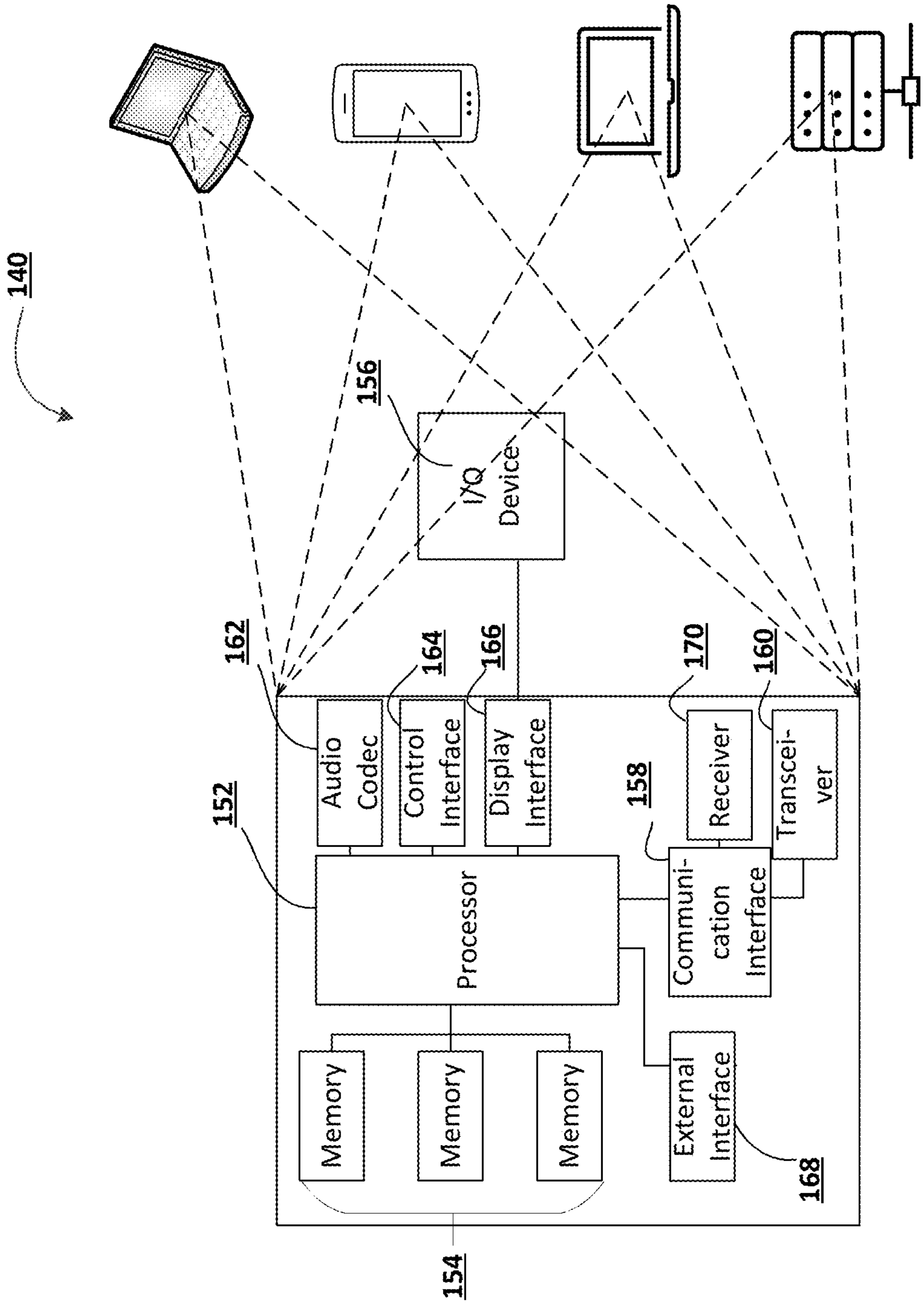
Figure 2:
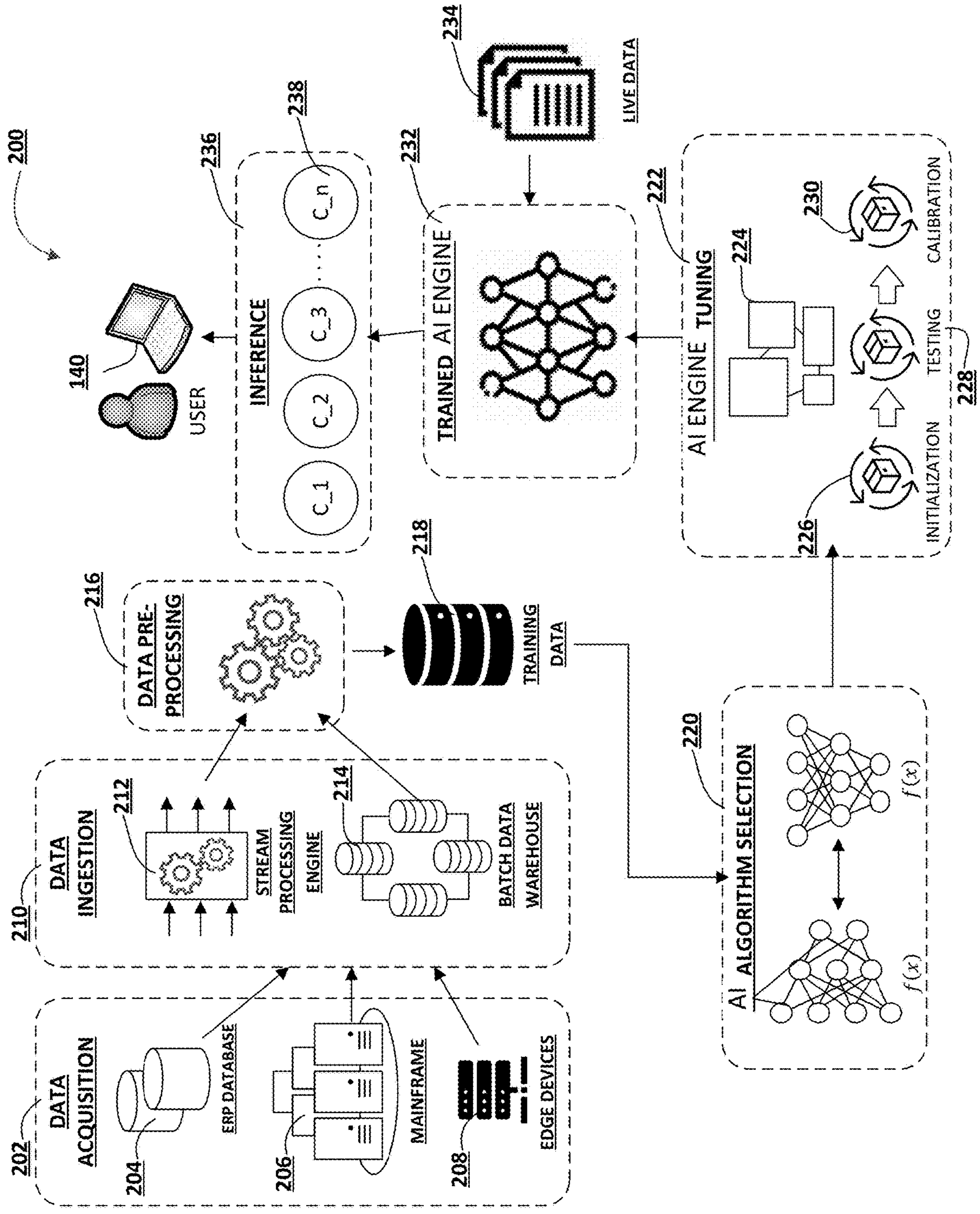
Figure 5:
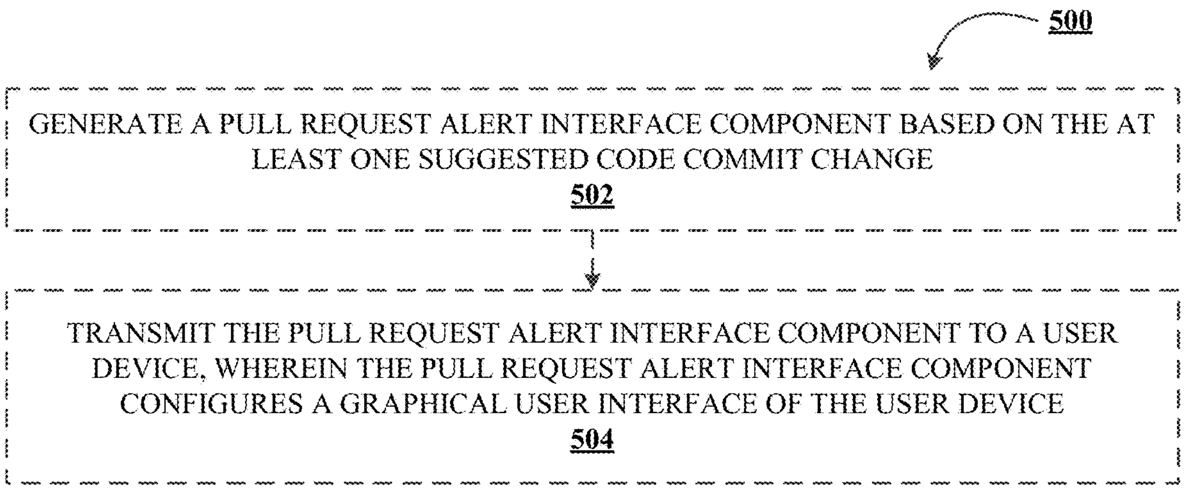
Figure 8:
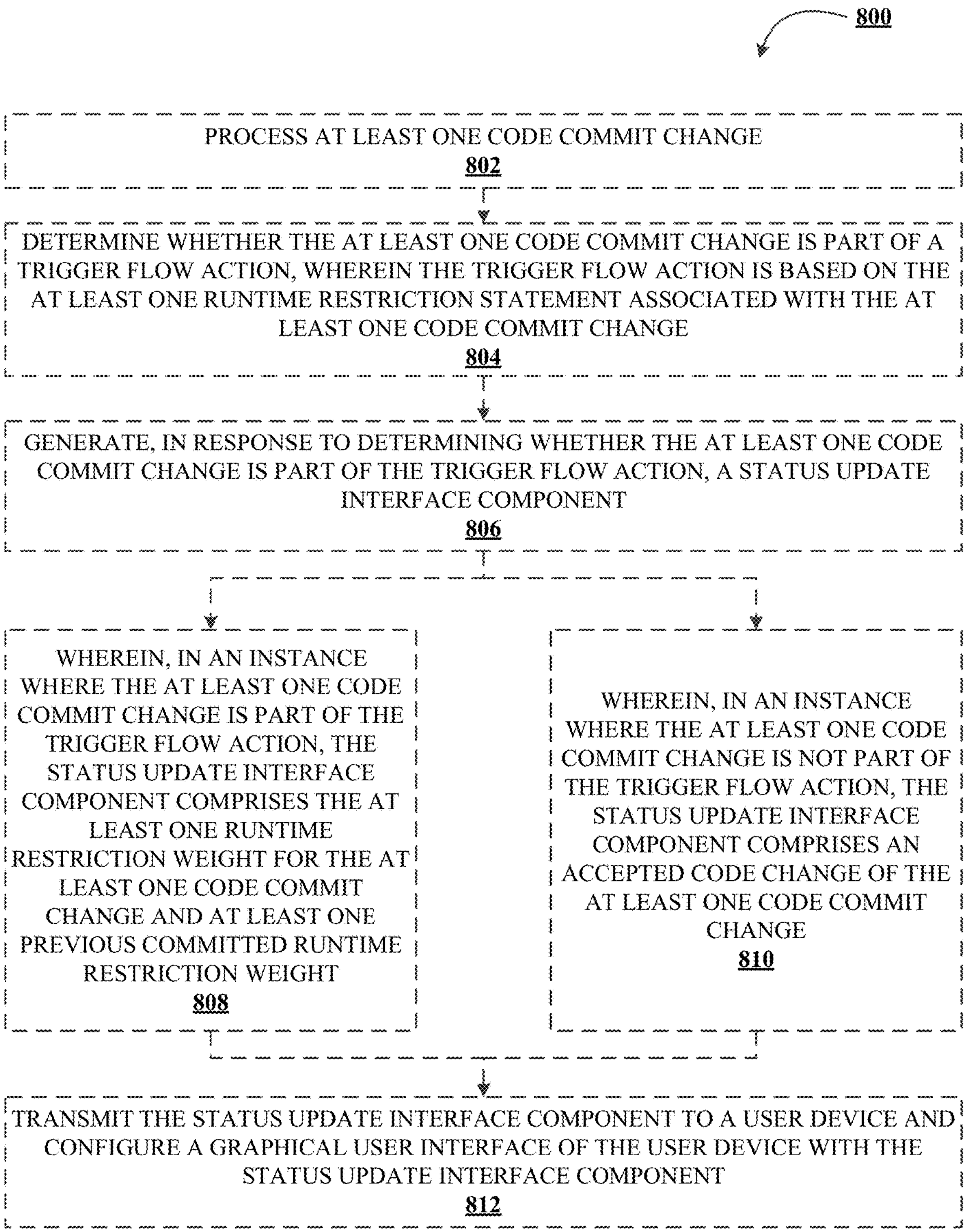
Figure 9:
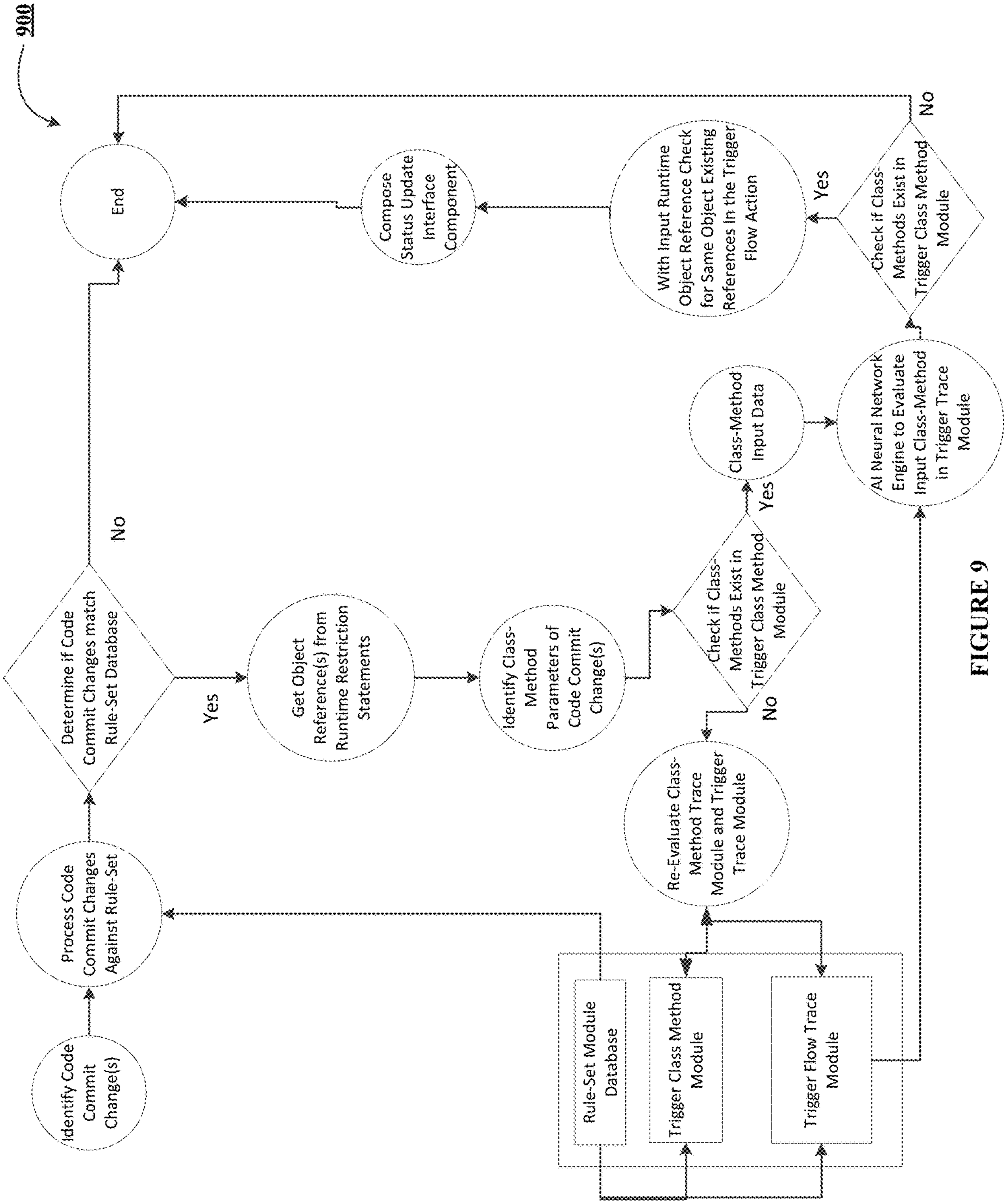

Having thus described embodiments of the invention in general terms, reference will now be made the accompanying drawings, wherein:

FIGS. 1A-1C illustrates technical components of an exemplary distributed computing environment for evaluating computing programming code changes using AI to improve computing performance and component consumption, in accordance with an embodiment of the invention;

FIG. 2 illustrates an exemplary artificial intelligence (AI) engine subsystem architecture, in accordance with an embodiment of the disclosure;

FIG. 3 illustrates a process flow for evaluating computing programming code changes using AI to improve computing performance and component consumption, in accordance with an embodiment of the disclosure;

FIG. 4 illustrates a process flow for determining a previous committed runtime restriction weight, in accordance with an embodiment of the disclosure;

FIG. 5 illustrates a process flow for generating and transmitting a pull request alert interface component, in accordance with an embodiment of the disclosure;

FIG. 6 illustrates a process flow for exemplary processes carried out by the trigger-class method module, in accordance with an embodiment of the disclosure;

FIG. 7 illustrates a process flow for exemplary processes carried out by the trigger trace module, in accordance with an embodiment of the disclosure;

FIG. 8 illustrates a process flow for exemplary processes carried out by a trained AI engine, in accordance with an embodiment of the disclosure;

FIG. 9 illustrates a process flow for exemplary processes for evaluating computing programming code changes using AI to improve computing performance and component consumption.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Tenants and users of Software as a Service (Saas) providers and Platform as a Service (PaaS) providers have many challenges, especially when SaaS and PaaS providers have limits on how often the SaaS and PaaS providers can be used, or how often their shared resources (e.g., platforms, database, applications, and/or the like) are being used or accessed. Additionally, and in order for one user not to monopolize the shared resources and to keep the shared resources operating efficiently and performing correctly, limits (e.g., restrictions on certain statements) are imposed. Further issues arise when code commit changes are implemented to code files or code repositories, when some code changes could increase the number of interactions that occur in the shared resources. Thus, there exists a need for a system which can efficiently, securely, and dynamically determine which code commit changes will result in greater interactions to shared resources, and thus, a closer possibility of meeting the shared resource's limit(s). Additionally, there exists a need for a system which can improve the performance of each of these shared resources (e.g., computing components such as databases, platforms, applications, and/or the like) by decreasing the number of interactions on each shared resource.

The disclosure provides a system for evaluating code changes that have been pushed, based on code quality for each potential code change and whether the code changes are part of a trigger transaction context or not. The system may use a code repository, a trigger-class method module (configured to generate a weight based on the number of runtime statements that are likely trigger transactions), a trigger flow trace module (configured to generate a weight based on the number of affected statements based on the trigger transactions identified), and a neural network (configured to evaluate whether the code changes are part of a trigger flow and what kind of class each code change is part of). Additionally, the system will determine if there are any runtime restrictions on the code changes that could create potential issues and make suggestions on how to change the potential code changes so there are less runtime restriction statements that would cause the shared resource limit to be met. The system further improves performance bottlenecks, prevents bad coding practices and removes unclean code—which in turn causes an improvement in computing resource consumption.

Accordingly, the present invention provides for an identification of at least one code commit change; compare the at least one code commit change to at least one runtime restriction statement stored in a rule-set database module; determine whether the at least one code commit change matches at the at least one runtime restriction statement; classify, in response to determining the at least one code commit change matches the at least one runtime restriction statement, the at least one code commit change as an at least one restriction code commit change; identify at least one object reference, at least one class, and at least one method associated with the at least one restriction code commit change; initiate a trigger-class method trace module on the at least one restriction code commit change, wherein the trigger-class method trace module generates at least one runtime restriction weight associated with each restriction code commit change; and initiate a trigger flow trace module on the at least one restriction code commit change, wherein the trigger flow trace module generates at least one suggested code commit change based on at least one of the at least one runtime restriction weight, the at least one object reference, or the at least one method, and wherein the at least one suggested code commit change decreases a runtime restriction level.

What is more, the present invention provides a technical solution to a technical problem. As described herein, the technical problem includes evaluating computing programming code changes, especially with respect to improving performance and component consumption. The technical solution presented herein allows for a system which can efficiently, securely, and dynamically determine which code commit changes will result in greater interactions to shared resources. In particular, the system is an improvement over existing solutions to the evaluating code commit changes automatically and suggesting code changes that improve resource restrictions levels (e.g., less the number of statements that will meet the resource restriction limit), (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., a system configured for evaluating computing programming code changes using AI to improve computing performance and component consumption), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for evaluating computing programming code changes using AI to improve computing performance and component consumption, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include the step of identifying at least one code commit change. As used herein, the at least one code commit change is associated with at least one source code, at least one file, or at least one code repository comprising previous committed code. In this manner, the code commit change, as used herein, is an intended change to an underlying code portion (e.g., a line of code, a script file/a source code file, a file, a code repository, a database, a table, and/or the like), whereby such a change may comprise a modification, an addition, a subtraction, and/or the like to the underlying code portion. Additionally, and as used herein, the underlying code portion may comprise a previously implemented code portion that has already been in use by a computing system, such that the underlying code portion has already had its own restriction statements which lend to its level of reaching or meeting the shared resource limit imposed by the SaaS, PaaS, and other such service provider. As used herein, the term limit refers to the shared resource limit imposed by a service provider such as SaaS, PaaS, and/or the like.

In some embodiments, the underlying code portion may comprise a file that has not yet been implemented, but is being wholly written and is about to run for the first time. In this manner, the underlying code portion receiving the code commit change may not have previously implemented restriction statements (i.e., a runtime restriction statement) and all of the code portions (e.g., the code commit change(s) and underlying code portion) may be used to calculate the number of runtime restriction statements to determine whether the runtime restriction statements meet or exceed the limit.

As shown in block 304, the process flow 300 may include the step of comparing the at least one code commit change to at least one runtime restriction statement stored in a rule-set database module. In some embodiments, the comparison of the at least one code commit change to at least one runtime restriction statement comprises a parsing and analyzing by the system to a rule-set database module, whereby the rule-set database module comprises rules or exemplary restriction statements that are used in determining whether the shared resource with a limit is being interacted with. For instance, a code commit change may comprise a database query of a database associated with a SaaS provider, and due to this query, the code commit change will cause the underlying code (when it is run) to interact with the SaaS's shared resource and is, thus, considered a runtime restriction statement as it adds to the shared resource limit of the shared resource.

Thus, and as used herein, the system described herein comprises a rule-set database module which comprises each of the runtime restriction statements which are used to count toward the shared resource limit for each shared resource provider used by a developer of programming language (e.g., a developer associated with a client of the shared resource provider and/or a developer associated with a client of the system described herein).

As shown in block 306, the process flow 300 may include the step of determining whether the at least one code commit change matches at least one runtime restriction statement. If, in the instance where at least one code commit change is matched with at least one runtime restriction statement found in the rule-set database module (e.g., based on the comparison described hereinabove), the system may continue to the process described herein with respect to block 308. In some embodiments, a plurality of code commit changes may be matched to at least one or a plurality of runtime restriction statements in the rule-set database.

In some embodiments, and in the instance where at least one code commit change does not match any of runtime restriction statements found in the rule-set database module (e.g., based on the comparison described hereinabove), then the system may automatically push or publish the code commit changes to the underlying code such that the code commit changes are implemented to the entire script file, the entire file, the entire database, the entire application, and/or the like.

As shown in block 308, the process flow 300 may include the step of classifying—in response to determining the at least one code commit change matches the at least one runtime restriction statement—the at least one code commit change as an at least one restriction code commit change. In some embodiments, the system may classify the code commit changes that match the runtime restriction statement(s) of the rule-set database module as a restriction code commit change. In this manner, the system can differentiate the code commit change(s) that will add to the shared resource limit and the code commit changes that will not add to the shared resource limit, whereby such restriction code commit change(s) are used as input(s) to the components described hereinbelow (e.g., trigger-class method trace module and/or trigger flow trace module and its components), rather than inputting all of the code commit changes identified at block 302.

In some embodiments, such a classification may comprise an attribute attached or saved in association with the code commit change, individually. In some embodiments, the classification may comprise an identifier indicating the code commit change's runtime restriction statement status, its location within the overall underlying code (e.g., the overall file, the overall script file, the overall database, the overall table, and/or the like), and/or the like. Additionally, and/or alternatively, the identifier may comprise an object reference for each code commit change, individually, such that the system can easily and efficiently determine the object's location in the shared resource that the code commit change is intending to interact with.

As shown in block 310, the process flow 300 may include the step of identifying at least one object reference, at least one class, and at least one method associated with the at least one restriction code commit change. In some embodiments, the system may identify at least one object reference for each restriction code commit change, whereby each object reference comprises information on how to find a particular piece of memory or data within a shared resource (e.g., such as information on a cell within a table stored in a shared resource). As used herein, the object reference comprises information on how to access a particular object stored or operated by a provider (such as an object stored in a shared resource, an application provided by a provider, and/or the like), whereby an object refers to a chunk of memory.

In some embodiments, the system may further be configured to determine the class and method for the shared resource based on the restriction code commit change and/or the object identified in the object reference associated with the restriction code commit change. As used herein, the class refers to an abstract grouping or entity that the object belongs to (e.g., the object "abc" used in programming language may comprise the "string" class). Additionally, and in some embodiments, the system may identify the method for each restriction code commit change and/or object, whereby the method as used herein refers to a function that operate on the data of the object (e.g., based on the code commit change and the function outlined in its programming language).

In some embodiments, such an identification of the class and method may be used as additional parameters and considerations by the system when determining whether the shared resource limit may be affected or met by the restriction code commit change (e.g., based on determining whether the object reference, the class, and the method) are accessing brand new objects for the underlying code portion, are using new methods as compared to the underlying code portion, and/or comprise different classes than the underlying code portion. Such a use of a new object references, classes, and/or methods as compared to the underlying code portion may add to the overall number of interactions with the shared resources, and thus, a greater likelihood of meeting the shared resource limit.

As shown in block 312, the process flow 300 may include the step of initiating a trigger-class method trace module on the at least one restriction code commit change, wherein the trigger-class method trace module generates at least one runtime restriction weight associated with each restriction code commit change. As used herein, the trigger-class method trace module is configured to generate a runtime restriction weight, which is used to identify the number of interactions with the shared resource, which may then be compared against the shared resource limit to determine whether the restriction code commit changes should be changed to lower the runtime restriction weight. Such a trigger-class method trace module is described in further detail below with respect to FIG. 6.

In some embodiments, the runtime restriction weight may comprise an overall value of the number of interactions with the shared resource (e.g., including the runtime restriction statements of the underlying code portion and the restriction code commit change(s)), which may be used to determine how close the underlying code and the code commit changes are to causing the shared resource limit to be hit. Additionally, and in some embodiments where an object reference is being accessed or interacted with in the same manner (e.g., using the same method), and in the same class between the underlying code portion and the restriction code commit change, the system (e.g., via the trigger-class method trace module) may only count the interaction as one value (within the runtime restriction weight) since the shared resource only needs to be interacted with a single time for the multiple instances.

For instance, the runtime restriction weight may comprise a one value for each interaction with each object, for each method, and for each class. By way of non-limiting example, if the code with the code commit change comprises a method comprising an access of a particular object in table X, and line of code in the underlying code portion comprises an access method of the same object in table X, then the system may generate the runtime restriction weight with a value of 1 (rather than a value of 2, which would comprise each interaction counting as its own value of 1).

In some embodiments, the runtime restriction weight is based on a trigger flow action, and wherein the at least one object reference is based on an action location for the trigger flow action. As used herein, the trigger flow action refers to a mechanism (such as a function within the programming code) which causes the program to initiate a specific action or workflow (such as a specific action for accessing, querying, and/or interacting with a shared resource). For example, the runtime restriction weight may be based on whether the object reference associated with the restriction code commit change comprises a trigger flow action which may automatically initiate an interaction with the shared resource at the specific object reference location.

As shown in block 314, the process flow 300 may include the step of initiating a trigger flow trace module on the at least one restriction code commit change, wherein the trigger flow trace module generates at least one suggested code commit change based on at least one of the at least one runtime restriction weight, the at least one object reference, or the at least one method, and wherein the at least one suggested code commit change decreases a runtime restriction level. In some embodiments, the system may generate a suggested code commit change for each of the restriction code commit changes that result in at least one additional value to the runtime restriction weight. For instance, and where a restriction code commit change is new (e.g., at least a new method, a new class, a new object reference, and/or a new runtime restriction statement that has not been used elsewhere in the underlying code), the runtime restriction weight will increase for each new restriction code commit change. In contrast, and where a restriction code commit change is not new (e.g., the method, class, object reference, and runtime restriction statement have all been used as a combination elsewhere in the underlying code), the runtime restriction weight may not be changed based on the non-new restriction code commit change.

Additionally, and where the restriction code commit change is new, the system (via the trigger flow trace module) may generate a suggested code commit change that would not add to the runtime restriction weight (i.e., it matches a method, class, object reference, and runtime restriction statement that has already been used in the underlying code), which would be usable in place of the new restriction code commit change.

In some embodiments, the trigger flow trace module comprises a trigger trace module and a trained artificial intelligence (AI) engine. For example, the trigger flow trace module may comprise at least one of a trigger trace module and/or a trained artificial intelligence engine. In this manner, each module and component may be configured to complete certain actions within the overall system, such that the actions are streamlined for efficiency and component consumption. Such embodiments detailing each of the trigger trace module and trained AI engine are discussed in further detail herein with respect to FIGS. 7 and 8, respectively.

FIG. 4 illustrates a process flow 400 for determining a previous committed runtime restriction weight, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400.

In some embodiments, and as shown in block 402, the process flow 400 may include the step of identifying at least one previous object reference associated with the previous committed code. For example, the system may identify at least one previous object reference (such as from the underlying code portion described hereinabove), whereby the previous object reference is associated with previously published, executed, and/or run code portions for the file, script file, and/or the like, associated with the code commit change(s).

In some embodiments, the system may be configured to identify at least one previous object reference for each of the previously executed code (i.e., previous committed code) of the underlying code portions, whereby each previous object reference is used as basis for the system to determine suggested code commit changes (e.g., like that described above with respect to block 314).

In some embodiments, and as shown in block 404, the process flow 400 may include the step of determining-based on the at least one previous object reference-a previous committed runtime restriction weight. For example, the system may determine a previous committed runtime restriction weight (e.g., the runtime restriction weight for the underlying code portion), whereby the previous committed runtime restriction weight may be used to determine the overall runtime restriction weight as compared to the shared resource limit. In some embodiments, the previous committed runtime restriction weight can be used as a basis for determining an allowable overall runtime restriction weight, whereby the suggested code commit changes that were suggested are only those that keep the overall runtime restriction weight the closest to the previous committed runtime restriction weight. For example, and where the previous runtime restriction weight is 20, but the overall runtime restriction weight with different variations of the suggested code commit change(s) comprise values of 22, 25, and 30, the system will choose the variation of suggested code commit change(s) with an overall runtime restriction weight of 22.

In some embodiments, the system may determine a difference between the shared resource limit and the previous committed runtime restriction weight in determining the availability of runtime restriction weight(s) available for the code commit change(s). In this manner, and in order to expedite the process, the system may only look at the number of runtime restriction statements allowable for the code commit change(s) and allow any code commit change(s) that do not cause the overall runtime restriction weight to meet or exceed the shared resource limit.

In some embodiments, and as shown in block 406, the process flow 400 may include the step of identifying at least one of at least one class, at least one method, or at least one runtime restriction statement for the previous committed code. In some embodiments, the process described with respect to block 402 may precede the process described herein with respect to block 406, such that the previous object reference may be used in combination with the other data associated with the previous committed code (e.g., the class(es), method(s), and/or the runtime restriction statement(s)).

In some embodiments, the system identify and/or determine only the class(es), the method(s), and/or the runtime restriction statement(s) for the previous committed code in make its determination of the previous committed runtime restriction weight. Similar to the process described above, the system may consider each of these data points to determine each interaction with the shared resource in order to determine the previous committed runtime restriction weight.

Specifically, and as shown in block 408, the process flow 400 may include the step of determining—based on at least one of the at least one class, the at least one method, or the at least one runtime restriction statement for the previous committed code—the previous committed runtime restriction weight. In this manner, and in some embodiments, the system may consider only a portion of the data points for each runtime restriction statement in making its determination of the previous committed runtime restriction weight in an efficient and less-resource consuming process.

In some embodiments, the previous committed runtime restriction weight may be based on a combination of the object reference for the previous committed code, the at least one method for the previous committed code, the at least one method for the previous committed code, and/or the at least one runtime restriction statement for the previous committed code. In this manner, the system may consider each of the data points surrounding the shared reference and each individual runtime statement in the underlying code in order to have a full picture when determining the previous committed runtime restriction weight.

FIG. 5 illustrates a process flow 500 for generating and transmitting a pull request alert interface component, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of generating a pull request alert interface component based on the at least one suggested code commit change. For example, the system may generate a pull request alert interface component based on the suggested code commit change (e.g., described above with respect to block 314), whereby the pull request alert interface component may comprise computer-readable data of the suggested code commit change, which may be used to generate graphical user interface components that can be read and interpreted by human users of the user device.

In some embodiments, the pull request alert interface component may comprise a plurality of suggested code commit changes, such that a user viewing the configured GUI (which has been configured by the pull request alert interface component) can choose from a plurality of suggested code commit changes to implement in the underlying code.

In some embodiments, the at least one pull request alert interface component comprises an identifier associated with the at least one restriction code commit change. For instance, and in some embodiments, the pull request alert interface component may comprise an identifier for each of the code commit changes that a suggested code commit change has been generated for. For instance, and in some embodiments, the identifier may comprise a line of code identifier (e.g., a number indicating a line), and/or the like. In some embodiments, the identifier may comprise the original restricted code commit change, with its language, as well as an object reference, a method indicator, a class indicator, and/or the like.

In some embodiments, and as shown in block 504, the process flow 500 may include the step of transmitting the pull request alert interface component to a user device, wherein the pull request alert interface component configures a graphical user interface (GUI) of the user device. For example, the system may transmit the pull request interface component to a user device (such as a user device associated with developer of the system, a developer of a client of the system, and/or the like), and the pull request alert interface component will configure the GUI of the user device to show the user of the user device the suggested commit code change(s).

FIG. 6 illustrates a process flow 600 for exemplary processes carried out by the trigger-class method module, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiment, and as shown in block 602, the process flow 600 may include the step of identifying—by the at least one lexical analysis component—the at least one class or at least one method for the at least one code commit change. Additionally, and in some embodiments, the trigger-class method module comprises at least one lexical analysis component comprising a regular expression component. For instance, and in some embodiments, the system may identify—using the trigger-class method module which comprises at least one lexical analysis component comprising a regular expression component—at least one class and/or at least method for the code commit change(s).

The identification of the class(es) and method(s) for each code commit change(s) may be based on applying a lexical analysis component from the trigger-class method module to the code commit change(s), such that the trigger-class method module can detect all the classes and methods in the code commit change(s). In some embodiments, the underlying code portion(s) and the code commit change(s) may be analyzed by the trigger-class method module, such that the trigger-class method module may detect all the classes and methods in the entire codebase (e.g., the overall file, overall script file, and/or the like). In some embodiments, the trigger-class method module may additionally and/or alternatively use lexical analysis and regular expressions to identify the trigger actions for the entire codebase (e.g., including the previous runtime restriction statements and the restriction statements of the code commit changes).

In some embodiments, and as shown in block 604, the process flow 600 may include the step of analyzing each method of the at least one method for the at least one code commit change. For instance, the system may additionally and/or alternatively analyze each method detected by the trigger-class method module for each of the code commit changes, whereby such a detection may additionally be carried out by the lexical analysis component comprising the regular expression component (similar to the process described above with respect to block 602). In some embodiments, the analyzation of the method(s) may comprise a complete reading through of the logic and descriptions (where application) for each method of each code commit change.

In some embodiments, the trigger-class method module may additionally analyze each of the underlying code portion's methods at the same time or immediately before or after the analyzation of the code commit change's method(s). Similarly, such an analyzation of the methods from the underlying code may comprise a complete reading through of the logic and descriptions (where application).

In some embodiments, and as shown in block 606, the process flow 600 may include the step of determining-based on the analyzation of each method—the at least one runtime restriction statement based on the rule-set database module. For example, the system (using the trigger-class method module) may recognize runtime statements using patterns from the rule-set database module, such that the trigger-class method module may identify non-exact matches of runtime restriction statements in the rule-set database module as compared to the code commit change(s). In this manner, the system (using the trigger-class method module and its components) can recognize runtime restriction statements in code commit changes even in the instance where the code commit changes do not exactly match the runtime restriction statements of the rule-set database module. Further, and in some embodiments, such a recognition of patterns based on the rule-set database module may occur using the lexical analysis component and the regular expression component.

In some embodiments, and as shown in block 608, the process flow 600 may include the step of generating—based on the at least one runtime restriction statement—a runtime restriction weight. For example, the system may generate—using the runtime restriction statement(s) identified in the code commit change(s)—the runtime restriction weight of the code commit change(s) (i.e., the runtime restriction weight for those code commit changes identified as having runtime restriction statements, which may also be classed as restriction code commit change(s)). Such a generation of the runtime restriction weight may follow the same process as that described above with respect to FIGS. 3 and 4.

In some embodiments, and as shown in block 610, the process flow 600 may include the step of refining the at least one code commit change associated with the at least one runtime restriction statement and identify the object reference for the at least one code commit change. For example, the system may refine each code commit change that were identified as having a runtime restriction statement to determine the object reference(s), whereby the refinement as used herein may comprise a process of parsing, analyzing, and/or the like, in order to determine each object reference for each restriction code commit change.

In some embodiments, and as shown in block 612, the process flow 600 may include the step of maintaining a logic flow associated with the at least one code commit change, wherein the logic flow comprises a hierarchical data format and the at least one object runtime restriction weight. For example, the system may maintain a logic flow associated with the code commit change associated with the runtime restriction statement (i.e., the restriction code commit change(s)), which the code commit change(s) organized by a hierarchical data format.

As used herein, the hierarchical data format refers to a set of file formats which are configured to store and organize the code commit change(s) based on their object-level runtime restriction weights. For instance, and where an object reference is used multiple times in the codebase (including within the code commit changes), and the runtime restriction weights show this amount, the system may format the code commit changes associated with these object references in a particular hierarchy (e.g., the object references with the greatest number of interactions may be listed first along with their respective code commit changes, their methods, their runtime restriction weights, and/or the like). In this manner, and by way of example, the system can determine which restriction code commit changes to address first in generating their suggested code commit changes.

FIG. 7 illustrates a process flow 700 for exemplary processes carried out by the trigger trace module, in accordance with an embodiment of the disclosure. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700. In some embodiments, an artificial intelligence engine (e.g., such as the AI engine shown in FIG. 2) may perform some or all of the steps described in process flow 700.

In some embodiments, and as shown in block 702, the process flow 700 may include the step of identifying at least one trigger associated with the at least one code commit change, wherein the at least one trigger is associated with at least one object reference. Additionally, and in some embodiments, the trigger trace module comprises at least one lexical analysis component comprising a regular expression component. For instance, the system may identify at least one trigger for each code commit change (e.g., those associated with a runtime restriction statement), whereby the trigger refers to a sequence of actions that automatically starts once a specific event occurs (such as when an output is generated by a previous line of code in the underlying code and/or the like). Thus, and in some embodiments, the trigger flow trace module may analyze and read all the triggers associated with each code commit change (and their associated object reference). In some embodiments, the trigger flow trace module additionally may analyze and read each of the classes and methods for each code commit changes within the trigger sequence, such that the trigger flow trace module can analyze each of the data points for each of the runtime statements, object references, classes, and methods.

In some embodiments, such an analyzation and reading of each of these data points, either individually and/or in combination, may be done using the lexical analysis component and/or regular expression component of the trigger trace module.

In some embodiments, and as shown in block 704, the process flow 700 may include the step of analyzing the at least one trigger associated with the at least one object reference. For instance, and in some embodiments, the trigger trace module may analyze the trigger associated with each object reference, such that the trigger trace module can determine the step-by-step sequence of the trigger in the code commit change(s) along with each of the object references that are being interacted with during the trigger. In some embodiments, such an analyzation of the trigger associated with the at least one object reference can help the system determine the proper sequence of the code commit change(s) within the trigger, their inputs, their outputs, and/or the like, in order to determine a full picture of how the trigger will operate.

In some embodiments, and as shown in block 706, the process flow 700 may include the step of identifying—by the at least one lexical analysis component—at least one class-method callout associated with the at least one trigger. For example, the system—using the trigger trace module and its lexical analysis component (with its regular expression component)—may identify whether any class-method callouts are occurring within the at least one trigger, such as those runtime statements that are making a call (e.g., an API call) to an external source or service (e.g., SaaS, PaaS, and/or the like) and receiving a response. Similar to the runtime restriction statements described herein, the class-method callout may occur in a similar manner, whereby callout refers to a call or request to access or communicate with an external source (e.g., a shared resource) and receive a response (such as an output from the shared resource). Additionally, the term class-method callout may refer to a specific class the external source will be found in or associated with, and the method may be used to identify the method with which the external source will be accessed or communicated with (which may comprise transmitting the callout and/or receiving the response).

In some embodiments, and as shown in block 708, the process flow 700 may include the step of analyzing the at least one class-method callout and determining the at least one runtime restriction statement based on the rule-set database module. For example, the trigger trace method may analyze (e.g., by the lexical analysis component and/or the regular expression component) the at least one class-method callout and determine the particular runtime restriction statement that the class-method callout is similar to or matches. In some embodiments, the trigger trace module may attempt to match the class-method callout to the runtime restriction statement(s) of the rule-set database module, such as by analyzing the pattern of the class-method callout, the pattern of the restriction rule statements, and comparing them.

In some embodiments, and before analyzing the class-method callout to determine the at least one runtime restriction statement, the trigger trace module may additionally and/or alternatively analyze and read each of the callouts, their logic and descriptions (where applicable), and determine whether nested class-method callouts exist within the trigger. In this manner, sub-class-method callouts may exist within primary class-method callouts of the trigger, and the system (using the trigger trace method) will need to parse and analyze the primary class-method callouts to gather a full picture of all the class-method callouts. In some embodiments, the number of nested class-method callouts may not have a limit (e.g., may comprise a secondary nesting, a third nesting, a fourth nesting, a fifth nesting, and/or the like). Thus, the trigger trace module may continuously repeat the process of analyzing the class-method callouts until it has exhausted all the nested class-method callout layers.

In some embodiments, and as shown in block 710, the process flow 700 may include the step of generating—based on the at least one runtime restriction statement—a runtime restriction weight. For example, the trigger trace module may generate—based on the identified runtime restriction statement(s)—the runtime restriction weight for the code commit change(s).

Further, and in some embodiments, the trigger trace module may capture and/or identify each of the runtime restriction weights for each of the class-method callouts identified, such that each class-method callout used may be associated with a runtime restriction weight. For instance, and where two class-method callouts comprise the same class, method, and a plurality of object references, the trigger trace module may sort the generated runtime restriction weight for the class-method callout based on the number of different object references.

In some embodiments, and as shown in block 712, the process flow 700 may include the step of refining the at least one code commit change associated with the at least one runtime restriction statement and identify the object reference for the at least one code commit change. For example, the trigger trace module may refine (e.g., parse, analyze, and/or the like) the runtime restriction statements associated with the class-method callouts to identify the object reference. Similar to the embodiment described above, the trigger trace module may additionally use the identified object references in generating the runtime restriction weights.

In some embodiments, and as shown in block 714, the process flow 700 may include the step of maintaining a logic flow associated with the at least one code commit change, wherein the logic flow comprises a hierarchical data format and the at least one object runtime restriction weight. For example, the trigger trace module may maintain a logic flow similar to the logic flow described above with respect to block 612, which organizes the object level runtime restriction weights based on the hierarchical data format (like that described above with respect to FIG. 6).

FIG. 8 illustrates a process flow 800 for exemplary processes carried out by the artificial intelligence (AI) engine of the trigger flow trace module, in accordance with an embodiment of the disclosure. In some embodiments, a system (e.g., similar to one or more of the systems described herein with respect to FIGS. 1A-1C) may perform one or more of the steps of process flow 800. For example, a system (e.g., the system 130 described herein with respect to FIG. 1A-1C) may perform the steps of process 800. In some embodiments, an artificial intelligence engine (e.g., such as the AI engine shown in FIG. 2) may perform some or all of the steps described in process flow 800.

In some embodiments, and as shown in block 802, the process flow 800 may include the step of processing at least one code commit change. For instance, the system—via the AI engine—may process the at least one code commit change identified in FIG. 3. Such a processing may occur by applying the at least one code commit change to the trained AI engine.

In some embodiments, and as shown in block 804, the process flow 800 may include the step of determining whether the at least one code commit change is part of a trigger flow action, wherein the trigger flow action is based on the at least one runtime restriction statement associated with the at least one code commit change. For example, the system may determine whether the at least one code commit change is part of a trigger flow action (e.g., part of a trigger), whereby the trained AI engine may determine whether any of the code commit changes match or are similar to any runtime restriction statements.

Additionally, and/or alternatively, the AI engine may be trained on the logic, descriptions, trigger action flows, and the runtime restriction statements from previous instances of code commit changes, classes, methods, underlying code changes, and/or the like.

In some embodiments, and as shown in block 806, the process flow 800 may include the step of generating—in response to determining whether the at least one code commit change is part of the trigger flow action—a status update interface component. For example, the trained AI engine may generate a status update interface component which may comprise computer-readable data that can be used by a user device to show graphics and other such GUI components with information regarding the current status of the code commit changes. For instance, and where the status of the code commit change comprises an allowable code commit change (e.g., the code commit changes do not add to the shared resource limit), the status update interface component may comprise an allowable indicator or attribute for the code commit change. In contrast, and where the code commit change does not comprise an allowable code commit change (e.g., the code commit changes does add to the shared resource limit), the status update interface component may comprise a rejection indicator or attribute for the code commit change.

In some embodiments, and as shown in block 808, the process flow 800 may include the step of generating the status update interface component comprising the at least one runtime restriction weight for the at least one code commit change and at least one previous committed runtime restriction weight, in an instance where the at least one code commit change is part of the trigger flow action. For example, the status update interface component may comprise the runtime restriction weight for just the code commit change(s) and the previous committed code commit change(s) to show the overall runtime restriction weight and the overall committed code changes.

In some embodiments, and as shown in block 810, the process flow 800 may include the step of generating the status update interface component comprising an accepted code change of the at least one code commit change, in an instance where the at least one code commit change is not part of the trigger flow action. For instance, the status update interface component may comprise the accepted code change(s) when the code commit change(s) do not increase the runtime restriction weight(s) to a disallowable level (e.g., too much and/or to meet the shared resource limit).

In some embodiments, and as shown in block 812, the process flow 800 may include the step of transmitting the status update interface component to a user device and configuring a graphical user interface (GUI) of the user device with the status update interface component. For example, the system may transmit the generated status update interface component to a user device (such as a user device associated with a client of the system or a developer associated with a client of the system, a user device associated with the system, and/or the like). Such a generated status update interface component may then be used to configure the GUI of the user device to show the status update of the code commit change(s) and other such data.

FIG. 9 illustrates a process flow for exemplary processes 900 for evaluating computing programming code changes using AI to improve computing performance and component consumption, in accordance with an embodiment of the disclosure. In some embodiments, a system (e.g., similar to one or more of the systems described herein with respect to FIGS. 1A-1C) may perform one or more of the steps of process flow 900. For example, a system (e.g., the system 130 described herein with respect to FIG. 1A-1C) may perform the steps of process 900. In some embodiments, an artificial intelligence engine (e.g., such as the AI engine shown in FIG. 2) may perform some or all of the steps described in process flow 900.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for evaluating computing programming code changes using AI to improve computing performance and component consumption, the system comprising:

a memory device with computer-readable program code stored thereon;

at least one processing device, wherein executing the computer-readable code is configured to cause the at least one processing device to perform the following operations:

identify at least one code commit change;

compare the at least one code commit change to at least one runtime restriction statement stored in a rule-set database module;

determine whether the at least one code commit change matches the at least one runtime restriction statement;

classify, in response to determining the at least one code commit change matches the at least one runtime restriction statement, the at least one code commit change as an at least one restriction code commit change;

identify at least one object reference, at least one class, and at least one method associated with the at least one restriction code commit change;

initiate a trigger-class method trace module on the at least one restriction code commit change, wherein the trigger-class method trace module generates at least one runtime restriction weight associated with each restriction code commit change; and initiate a trigger flow trace module on the at least one restriction code commit change, wherein the trigger flow trace module generates at least one suggested code commit change based on at least one of the at least one runtime restriction weight, the at least one object reference, or the at least one method, wherein the at least one suggested code commit change decreases a runtime restriction level;

wherein the trigger flow trace module comprises a trigger trace module, a trained artificial intelligence engine, and wherein the trained artificial intelligence engine comprises a neural network, and wherein the trained artificial intelligence engine is configured to:

process the at least one code commit change;

determine whether the at least one code commit change is part of a trigger flow action, wherein the trigger flow action is based on the at least one runtime restriction statement associated with the at least one code commit change;

generate, in response to determining whether the at least one code commit change is part of the trigger flow action, a status update interface component, wherein, in an instance where the at least one code commit change is part of the trigger flow action, the status update interface component comprises the at least one runtime restriction weight for the at least one code commit change and at least one previous committed runtime restriction weight, or wherein, in an instance where the at least one code commit change is not part of the trigger flow action, the status update interface component comprises an accepted code change of the at least one code commit change; and transmit the status update interface component to a user device and configure a graphical user interface of the user device with the status update interface component.

2. The system of claim 1, wherein the at least one code commit change is associated with at least one source code, at least one file, or at least one code repository comprising previously committed code.

3. The system of claim 2, wherein executing the computer-readable code is configured to cause the at least one processing device to perform the following operations:

identify at least one previous object reference associated with the previously committed code; and determine, based on the at least one previous object reference, a previous committed runtime restriction weight.

4. The system of claim 3, wherein executing the computer-readable code is configured to cause the at least one processing device to perform the following operations:

identify at least one of at least one class, at least one method, or at least one runtime restriction statement for the previously committed code; and determine, based on at least one of the at least one class, the at least one method, or the at least one runtime restriction statement for the previously committed code, the previous committed runtime restriction weight.

5. The system of claim 1, wherein the runtime restriction weight is based on the trigger flow action, and wherein the at least one object reference is based on an action location for the trigger flow action.

6. The system of claim 1, wherein executing the computer-readable code is configured to cause the at least one processing device to perform the following operations:

generate a pull request alert interface component based on the at least one suggested code commit change; and transmit the pull request alert interface component to the user device, wherein the pull request alert interface component configures the graphical user interface of the user device.

7. The system of claim 6, wherein the at least one pull request alert interface component comprises an identifier associated with the at least one restriction code commit change.

8. The system of claim 1, wherein the trigger-class method module comprises at least one lexical analysis component comprising a regular expression component, and wherein the trigger-class method module is configured to:

identify, by the at least one lexical analysis component, the at least one class or the at least one method for the at least one code commit change;

analyze each method of the at least one method for the at least one code commit change;

determine, based on the analyzation of each method, the at least one runtime restriction statement based on the rule-set database module;

generate, based on the at least one runtime restriction statement, a runtime restriction weight;

refine the at least one code commit change associated with the at least one runtime restriction statement and identify the object reference for the at least one code commit change; and maintain a logic flow associated with the at least one code commit change, wherein the logic flow comprises a hierarchical data format and the at least one object runtime restriction weight.

9. The system of claim 1, wherein the trigger trace module comprises at least one lexical analysis component comprising a regular expression component, and wherein the trigger trace module is configured to:

identify at least one trigger associated with the at least one code commit change, wherein the at least one trigger is associated with the at least one object reference;

analyze the at least one trigger associated with the at least one object reference;

identify, by the at least one lexical analysis component, at least one class-method callout associated with the at least one trigger;

analyze the at least one class-method callout and determine the at least one runtime restriction statement based on the rule-set database module;

generate, based on the at least one runtime restriction statement, a runtime restriction weight;

refine the at least one code commit change associated with the at least one runtime restriction statement and identify the object reference for the at least one code commit change; and maintain a logic flow associated with the at least one code commit change, wherein the logic flow comprises a hierarchical data format and the at least one object runtime restriction weight.

10. A computer program product for evaluating computing programming code changes using AI to improve computing performance and component consumption, wherein the computer program product comprises at least one non-transitory computer-readable medium having computer-readable program code portions embodied therein, the computer-readable program code portions which when executed by a processing device are configured to cause a processor to perform the following operations:

identify at least one code commit change;

compare the at least one code commit change to at least one runtime restriction statement stored in a rule-set database module;

determine whether the at least one code commit change matches the at least one runtime restriction statement;

classify, in response to determining the at least one code commit change matches the at least one runtime restriction statement, the at least one code commit change as an at least one restriction code commit change;

identify at least one object reference, at least one class, and at least one method associated with the at least one restriction code commit change;

initiate a trigger-class method trace module on the at least one restriction code commit change, wherein the trigger-class method trace module generates at least one runtime restriction weight associated with each restriction code commit change; and initiate a trigger flow trace module on the at least one restriction code commit change, wherein the trigger flow trace module generates at least one suggested code commit change based on at least one of the at least one runtime restriction weight, the at least one object reference, or the at least one method, wherein the at least one suggested code commit change decreases a runtime restriction level;

wherein the trigger flow trace module comprises a trigger trace module, a trained artificial intelligence engine, and wherein the trained artificial intelligence engine comprises a neural network, and wherein the trained artificial intelligence engine is configured to:

process the at least one code commit change;

determine whether the at least one code commit change is part of a trigger flow action, wherein the trigger flow action is based on the at least one runtime restriction statement associated with the at least one code commit change;

generate, in response to determining whether the at least one code commit change is part of the trigger flow action, a status update interface component, wherein, in an instance where the at least one code commit change is part of the trigger flow action, the status update interface component comprises the at least one runtime restriction weight for the at least one code commit change and at least one previous committed runtime restriction weight, or wherein, in an instance where the at least one code commit change is not part of the trigger flow action, the status update interface component comprises an accepted code change of the at least one code commit change; and transmit the status update interface component to a user device and configure a graphical user interface of the user device with the status update interface component.

11. The computer program product of claim 10, wherein the at least one code commit change is associated with at least one source code, at least one file, or at least one code repository comprising previously committed code.

12. The computer program product of claim 11, wherein the computer-readable program code portions which when executed by the processing device are configured to cause the processor to perform the following operations:

identify at least one previous object reference associated with the previously committed code; and determine, based on the at least one previous object reference, a previous committed runtime restriction weight.

13. The computer program product of claim 12, wherein the computer-readable program code portions which when executed by the processing device are configured to cause the processor to perform the following operations:

identify at least one of at least one class, at least one method, or at least one runtime restriction statement for the previously committed code; and determine, based on at least one of the at least one class, the at least one method, or the at least one runtime restriction statement for the previously committed code, the previous committed runtime restriction weight.

14. The computer program product of claim 10, wherein the runtime restriction weight is based on the trigger flow action, and wherein the at least one object reference is based on an action location for the trigger flow action.

15. A computer implemented method for evaluating computing programming code changes using AI to improve computing performance and component consumption, the computer implemented method comprising:

identifying at least one code commit change;

comparing the at least one code commit change to at least one runtime restriction statement stored in a rule-set database module;

determining whether the at least one code commit change matches the at least one runtime restriction statement;

classifying, in response to determining the at least one code commit change matches the at least one runtime restriction statement, the at least one code commit change as an at least one restriction code commit change;

identifying at least one object reference, at least one class, and at least one method associated with the at least one restriction code commit change;

initiating a trigger-class method trace module on the at least one restriction code commit change, wherein the trigger-class method trace module generates at least one runtime restriction weight associated with each restriction code commit change; and initiating a trigger flow trace module on the at least one restriction code commit change, wherein the trigger flow trace module generates at least one suggested code commit change based on at least one of the at least one runtime restriction weight, the at least one object reference, or the at least one method, and wherein the at least one suggested code commit change decreases a runtime restriction level, wherein the trigger flow trace module comprises a trigger trace module, a trained artificial intelligence engine, and wherein the trained artificial intelligence engine comprises a neural network, and wherein the trained artificial intelligence engine is configured to:

process the at least one code commit change;

determine whether the at least one code commit change is part of a trigger flow action, wherein the trigger flow action is based on the at least one runtime restriction statement associated with the at least one code commit change generate, in response to determining whether the at least one code commit change is part of the trigger flow action, a status update interface component, wherein, in an instance where the at least one code commit change is part of the trigger flow action, the status update interface component comprises the at least one runtime restriction weight for the at least one code commit change and at least one previous committed runtime restriction weight, or wherein, in an instance where the at least one code commit change is not part of the trigger flow action, the status update interface component comprises an accepted code change of the at least one code commit change: and transmit the status update interface component to a user device and configure a graphical user interface of the user device with the status update interface component.

16. The computer implemented method of claim 15, wherein the at least one code commit change is associated with at least one source code, at least one file, or at least one code repository comprising previously committed code.

17. The computer implemented method of claim 16, wherein the computer implemented method further comprises:

identifying at least one previous object reference associated with the previously committed code; and determining, based on the at least one previous object reference, a previous committed runtime restriction weight.

18. The computer implemented method of claim 17, wherein the computer implemented method further comprises:

identifying at least one of at least one class, at least one method, or at least one runtime restriction statement for the previously committed code; and determining, based on at least one of the at least one class, the at least one method, or the at least one runtime restriction statement for the previously committed code, the previous committed runtime restriction weight.

* * * * *